INVENTOR.
BENJAMIN L. FRANKLIN
BY
ATTORNEY

INVENTOR.
BENJAMIN L. FRANKLIN
BY
ATTORNEY

June 20, 1961 B. L. FRANKLIN 2,989,110

METHOD OF IMPROVING THE SHARPENED EDGE OF A BLADE AND APPARATUS TO ACCOMPLISH THE SAME

Filed Feb. 18, 1957 4 Sheets-Sheet 3

INVENTOR.
BENJAMIN L. FRANKLIN
BY
ATTORNEY

INVENTOR.
BENJAMIN L. FRANKLIN
BY [signature]
ATTORNEY

United States Patent Office 2,989,110
Patented June 20, 1961

2,989,110

METHOD OF IMPROVING THE SHARPENED EDGE OF A BLADE AND APPARATUS TO ACCOMPLISH THE SAME

Benjamin L. Franklin, Jacobus, Pa.

Filed Feb. 18, 1957, Ser. No. 640,797
10 Claims. (Cl. 153—85)

This invention relates to a method of improving the sharpened edge of a blade and also includes a plurality of embodiments of apparatus to accomplish said method. More particularly, the method and apparatus pertain to the improving the sharpness of a sharpened edge of a razor blade but the invention is not restricted to this type of blade alone in that other types of flexible blades may have the sharpness thereof improved by the invention, such as blades comprising various kinds of knives and instruments which preferably must be kept delicately sharp such as surgical instruments, slitting blades of various kinds, and any other type of instrument employing a thin blade having a cutting edge.

Sharpened edges are produced upon various kinds of blades usually by grinding and/or honing the same. Notwithstanding the fact that extreme care is used in these operations and, in many forms of sharpening of this type, fine grained granding wheels are used, nevertheless when the edges are inspected under a sufficiently powerful microscope, it will be found that the edges are very jagged in appearance and comprise a plurality of heterogeneously arranged metal fibers bent and extending in various directions. The honing of such sharpened edges will eliminate a certain number of these fibers by breaking them from the edge. However, under certain circumstances, particularly if these fibers can be arranged so as to extend outwardly from said edge substantially within the plane of the blade for example, they improve the cutting action of the blade. Hence, it is not always best to remove an undue number of such projecting fibers by honing the blades. As far as is known to the present time however, no means has been offered for straightening these projecting misroscopic fibers which project from the blade edge so as to arrange them in the aforementioned desired projecting form.

The principal object of the present invention is to provide a method of improving the sharpness of blades having at least one sharpened edge by flexing said blade in opposite directions along spaced lines extending transversely to the sharpened edge, said lines being spaced longitudinally along said edge. It has been found that such flexing materially straightens said fibers and vastly improves the cutting quality of the edge over the condition in which the edge is formed by conventional grinding and honing as well as other presently used finishing operations.

Another object of the invention is to provide a plurality of different embodiments of apparatus suitable to accomplish such flexing of the blade quickly and safely, some of these embodiments being intended primarily for commercial operations such as in finishing razor blades in a factory, while other embodiments are intended for domestic or other home use, in offices, laboratories and the like, these embodiments being manually operable preferably.

Details of the foregoing objects and particularly of the various embodiments of apparatus for performing the method comprising part of the invention, and other objects thereof are set forth in the following specification and illustrated in the accompanying drawings comprising part of the same.

Figure 1:
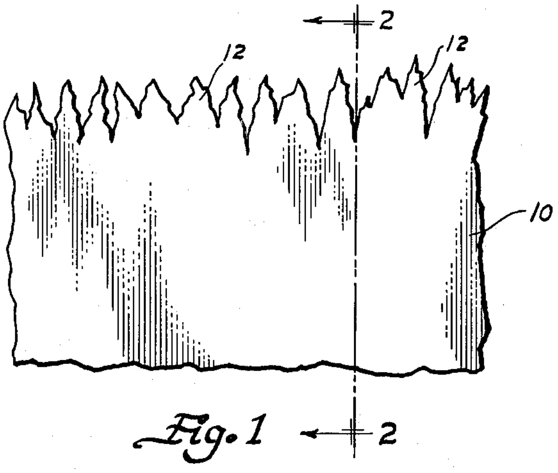
FIG. 1 is an exemplary, fragmentary plan view of an edge of a blade such as a commercial razor blade, greatly magnified, and showing the characteristic metal fibers existing at the edge thereof.
Figure 2:
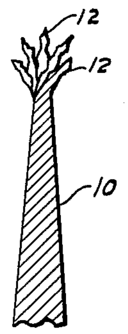
FIG. 2 is a sectional elevation taken on the line 2—2 of FIG. 1 and illustrating particularly the heterogeneous arrangement of the metal fibers on the edge of the blade illustrated in FIG. 1.

Referring to FIGS. 1 and 2, an illustration has been made of a highly magnified appearance, respectively in plan and side views of a delicately sharpened blade such as a razor blade. In order to obtain this appearance of blade edge 10, it is necessary to magnify the blade edge in excess of 2,000 times. The illustration shown in these figures however is exemplary of blade edges of this type when magnified to the order specified. It will be seen that in addition to the metallic fibers 12 being very jagged in plan view, when referring to FIG. 2 it will be seen further that said fibers are disposed in heterogeneous manner in various directions. Said fibers are so small and delicate that even lightly touching them to a honing surface tends to flex and bend them into formations similar to the exemplary illustration shown in FIG. 2. It can be appreciated from these figures that if the fibers 12, particularly as viewed in FIG. 2, or disposed so as to extend substantially straight from the blade edge and be disposed approximately within the plane of the blade per se, the sharpness of the edge would be improved greatly.

It has been found that if a flexible blade such as a razor blade is flexed along lines extending transversely to the blade edge, and preferably flexed in opposite directions a number of times, and this operation is repeated at longitudinally spaced points or lines along the blade edge, a great improvement in the straightening of the fibers 12 results, whereby most of the same are straightened so as to extend substantially outward from the blade edge within the plane of the blade. Hence, it will be appreciated that this method of straightening the fibers of a blade edge and thereby improving the sharpness thereof is very simple and may be accomplished manually by holding a razor blade for example between one's fingers and flexing the blade along lines transverse to the blade edge.

Such flexing of the blade may be accomplished by a number of different mechanisms however, certain embodiments of which are illustrated in the drawings and are described hereinafter. For example, in FIGS. 3 through 5 a machine is illustrated by which razor blades or other blades of similar flexibility may have the sharpened edge or edges thereof improved by such flexing. In this machine illustrated in these figures and comprising one embodiment of apparatus of the invention, a plurality of rollers 14 are mounted between a pair of rails 16 and 18 for rotatable support thereby. If preferred, the rollers 14 may have terminal flanges 20 at opposite ends thereby to prevent the blades from accidentally moving from the ends of the rollers.

Figure 3:
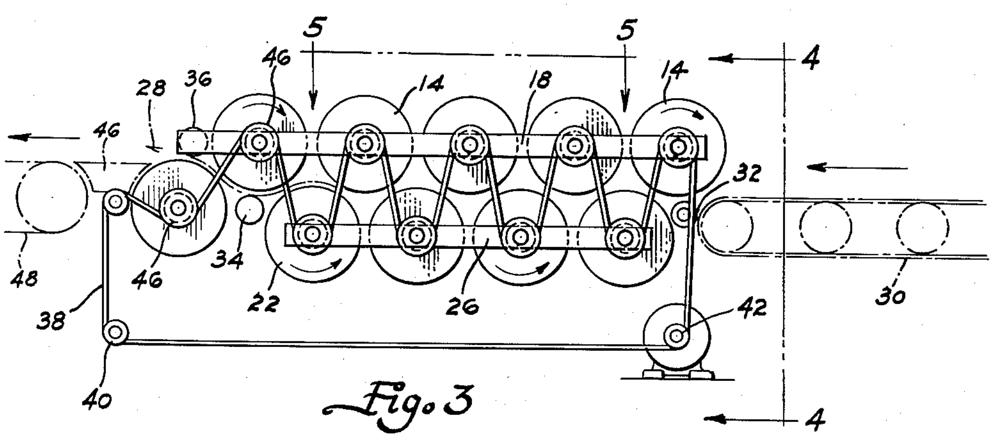
FIG. 3 is a side elevation of an exemplary embodiment of apparatus particularly suited for commercial operations to improve the sharpness of the sharpened edges of blades such as razor blades, this view being somewhat diagrammatic to simplify the illustration.

A second group or bank of rollers 22, similar to the rollers 14, are supported between a second pair of rails 24 and 26, relative to which the rollers 22 are rotatable. It will be seen that the rollers 14 and 22 in the respective banks or groups thereof are longitudinally spaced apart as shown in FIG. 3 and a portion of the rollers of each bank extend into the valleys between adjacent rollers of the opposite bank, whereby when a blade 28, such as a razor blade is moved longitudinally between said banks of rollers 14 and 22, it will be reversely flexed as clearly shown near the left-hand end of FIG. 3. Hence, each bank of rollers 14 and 22, with their supporting rails, may be considered crenelated members which cooperate with each other to achieve the desired flexing of the blade 28, thereby improving the sharpness of the sharpened edges thereof.

To facilitate the operation of the machine shown in FIG. 3, a feed belt 30 is provided for purposes of introducing the blades 28 in a longitudinal series to the space between the banks of rollers 14 and 22. Additional idler rollers 32, 34 and 36 also are provided for purposes of facilitating the desired insertion of the blades 28 relative to a space between the opposite banks of rollers 14 and 22, and removed therefrom.

It will be understood that the rails 16, 18, 24 and 26, as well as the idler rollers 32, 34 and 36 may be supported by any suitable frame means, the pivots of all of said rollers preferably being fixed relative to each other so as to accomplish the desired guiding and flexing of the blades 28 while passing between the rollers 22 and 24, and incidentally being flexed in accordance with the principles of the invention.

The rollers 14 and 22 in each bank thereof are all simultaneously and uniformly driven by any suitable means such as a belt 38 supported by suitable guide pulleys 40, the belt also being driven by a drive pulley 42 operated by motor 44. The belt 38 passes around driven pulleys 46 mounted upon the shaft of each of the rollers 14 and 22, as clearly shown in FIGS. 3 and 4 the belt being arranged so that all of the rollers 14 are driven unidirectionally and all of the rollers 22 likewise are driven unidirectionally. However, as shown in FIG. 3, while the rollers 14 are driven clockwise, the rollers 22 are driven counter-clockwise in order that desired movement of the blades 28 through the space between the banks of rollers may be accomplished. It is to be understood that any suitable means may be used to drive the rollers 14 and 22 such as appropriate gearing, a sprocket chain, or otherwise. When the blades have passed through the space between the two banks of rollers 14 and 22, and have been flexed reversely a number of times, they are discharged onto a bridging member 46, for example, and from there may be carried from the machine by a discharge conveyor 48.

Figure 4:
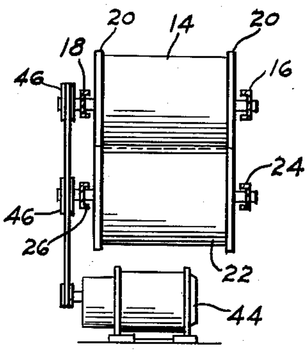
FIG. 4 is an end view of the embodiment of machine shown in FIG. 3 and as viewed on the line 4—4 of said figure.
Figure 5:
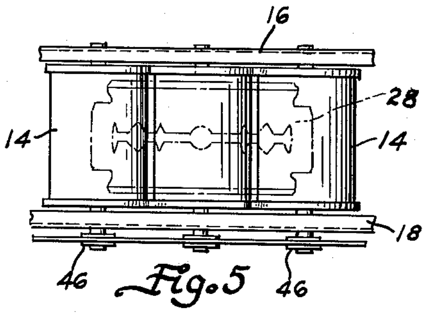
FIG. 5 is a fragmentary top plan view taken on the line 5—5 of FIG. 3 and illustrating a portion of the machine embodiment shown therein to illustrate the manner in which an exemplary razor blade passes through said machine.

From the foregoing, it will be seen that the machine illustrated in FIGS. 3 through 5 is suited readily for mass operation upon sharpened blades to improve the sharpness thereof in accordance with the principles of the invention. The general arrangement of flexing rollers primarily is exemplary and other means may be used to support and drive the same in accordance with standard engineering practice. In order that the invention might be more simply used in the home, laboratory or office for example, additional embodiments of apparatus embodying the principles of the invention are shown in Sheets 2 through 4 of the drawings which will now be described.

Figure 6:
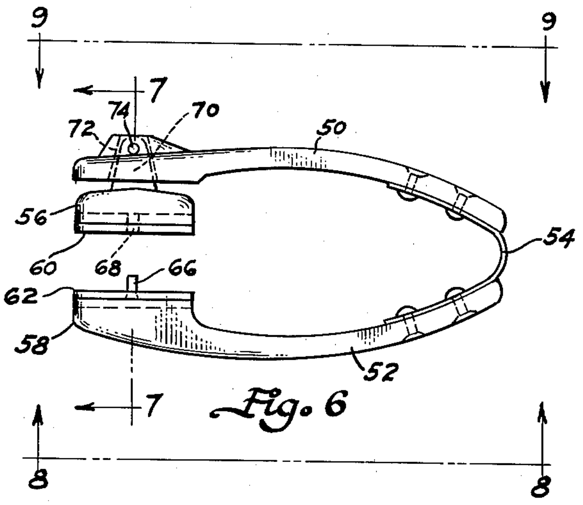
FIG. 6 is a side elevation of another embodiment of apparatus for performing the method of the invention, this embodiment being manually operable.
Figure 7:
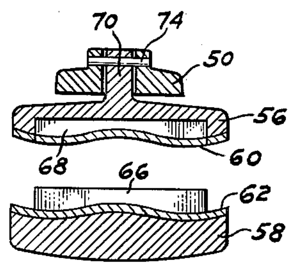
FIG. 7 is a vertical sectional elevation taken on the line 7—7 of FIG. 6 to illustrate particularly the crenelated surfaces of the blade flexing members of the apparatus.
Figure 8:
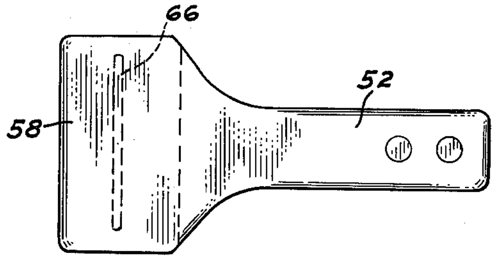
FIG. 8 is a bottom plan view of the apparatus shown in FIG. 6 as viewed from the line 8—8 of the latter figure.

In FIGS. 6 through 10, a simple and convenient manually operable mechanism is shown comprising a pair of handles 50 and 52 which conveniently may be formed inexpensively from any suitable material such as molded synthetic resin, die cast metal, or the like. The handles preferably are connected at one end by hinge means, one example of which as shown in FIG. 6 comprises a flexible spring member 54 which supports the handle for engagement between the thumb and finger of the user for example. Connected to the opposite ends of the handles 50 and 52 are a pair of plate-like members 56 and 58 which have complementary crenelated surfaces 60 and 62 that cooperate with each other to reversely flex a blade such as razor blade 64 shown in FIG. 10 when disposed between the surfaces 60 and 62 and the handles 50 and 52 are operated to move the surfaces into blade flexing relationship. The flexible member 54 restores the members 56 and 58 to spaced relationship as shown in FIG. 6.

Figure 10:
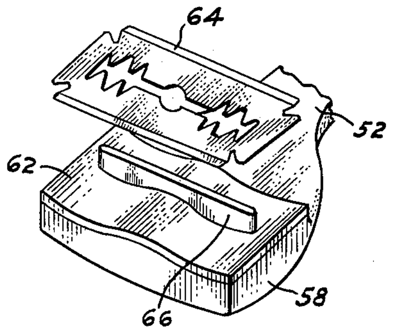
FIG. 10 is a perspective fragmentary view illustrating an exemplary razor blade being positioned upon one of the crenelated members of the apparatus shown in Fig. 6.
Figure 9:
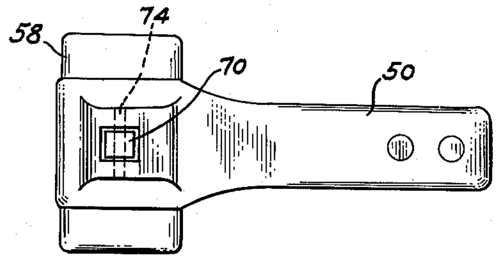
FIG. 9 is a top plan view of the apparatus shown in FIG. 6 as viewed from the line 9—9 of the latter figure.

To facilitate the positioning of a slotted blade 64 such as shown in FIG. 10 upon the member 58 for example, a longitudinal rib 66 is formed so as to extend transversely to the axes of the curves of the crenelated surface 62, it being understood that the curves 60 and 62 are generated about a plurality of spaced axes. The rib 66 is received by a slot 68 in member 56 when the members are moved into blade flexing position. Also, to facilitate the parallel engagement of member 56 with member 58, the member 56 is pivotally connected to handle 50 by any suitable means such as a tongue 70 which extends into an opening 72 in the outer end of handle 50 and a pin 74 connects the tongue 70 to the outer end of handle 50. Thereby, a limited floating movement of member 56 relative to handle 50 is afforded.

Figure 11:
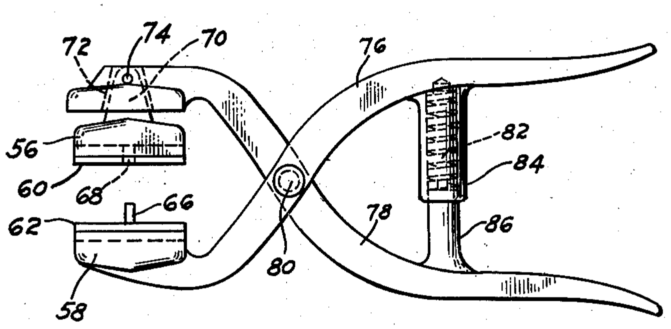
FIG. 11 is a side elevation of still another embodiment of apparatus embodying the principles of the invention, this embodiment having plier-like manually operable handles.
Figure 13:
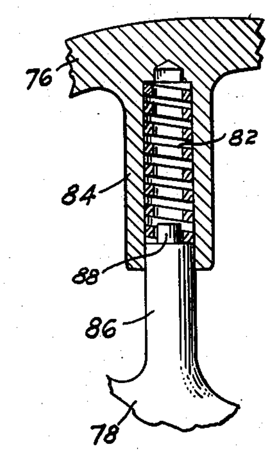
FIG. 13 is a fragmentary enlarged side elevation of a portion of the embodiment of apparatus shown in FIG. 11.
Figure 12:
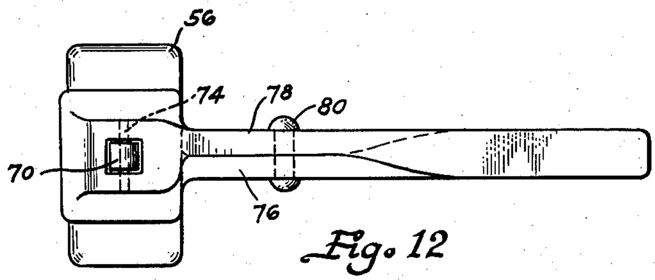
FIG. 12 is a top plan view of the embodiment of apparatus shown in FIG. 11.

In FIGS. 11 through 13, another embodiment of manually operable mechanism is illustrated. In this embodiment, the blade flexing members are similar to the embodiments shown in FIGS. 6 through 10 and the principal difference between these embodiments is that the ones shown in FIGS. 11 through 13 have a pair of cross-handles 76 and 78 resembling pliers, connected by a pivot 80. Any suitable means such as a spring 82, disposed within a tubular member 84 connected to handle 76, may be used. The outer end of spring 82 is engaged by a projecting lug 86 on handle 78 and, as shown in larger scale in FIG. 13, the projecting lug 86 may have an extension 88 received within spring 82 so as better to position the spring relative to lug 86. After a blade has been flexed between the members 56 and 58, the spring 82 will restore the members to separated position, after which the blade may be reversed and again positioned between the members 56 and 58, and upon next moving the members 56 and 58 to blade flexing position, the blade will be flexed reversely to that to which it was subjected during the previous flexing.

Figure 14:
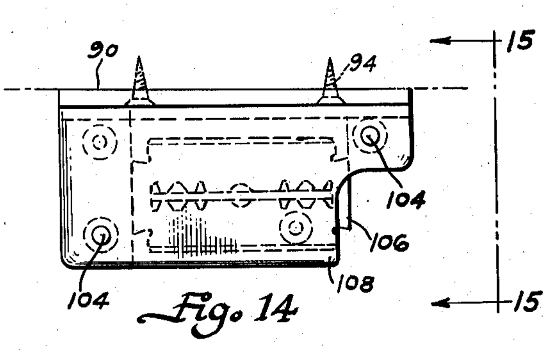
FIG. 14 is a top plan view of still another embodiment of apparatus incorporating the principles of the present invention and including bracket means shown attached to an exemplary fixed surface such as the wall of a bathroom.
Figure 15:
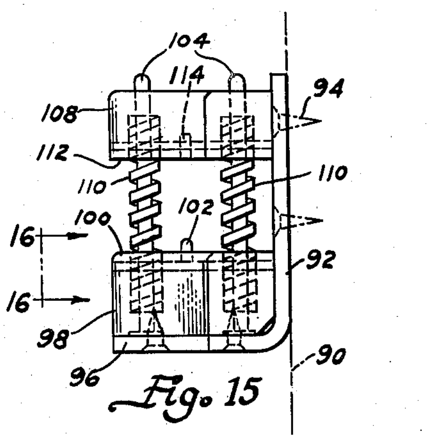
FIG. 15 is a side elevation of the embodiment of apparatus shown in FIG. 14 as viewed from the line 15—15 of the latter figure.
Figure 16:
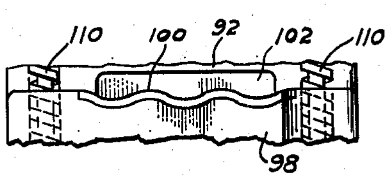
FIG. 16 is a fragmentary front elevation of the apparatus shown in FIGS. 14 and 15 as seen from the line 16—16 of the latter figure.

Still another embodiment of a domestic type of blade flexing means is illustrated in FIGS. 14 through 16, this being particularly suited for mounting upon a fixed surface such as a wall 90. In this embodiment, the mechanism comprises a bracket 92 which may be secured to the wall by any suitable means such as screws 94. A horizontal portion 96 on the bracket supports a relatively stationary blade flexing member 98 having a crenelated upper surface 100 and a positioning rib 102 similar to the surface 62 and rib 66 of the previously described embodiments. Also extending upwardly from horizontal portion 96 of the bracket are a pair of vertical elongated guides 104 which are positioned adjacent the ends thereof as shown in FIG. 14 and thereby do not interfere with placing a blade 106 upon the surface 100 and rib 102. Slidably mounted upon the upper ends of guides 104 is a movable flexing member 108 having suitable guide holes therein which slidably receive the guides 104. Surrounding the guides 104 and also extending into suitable cavities in the adjacent faces of flexing members 98 and 108 are a plurality of compression springs 110 for purposes of automatically separating the blade flexing members following a flexing operation.

The lower surface of movable flexing member 108 is provided with a crenelated surface 112 which is complementary with the surface 100 whereby it will be seen that when the blade 106 is placed upon the surface 100 and positioned by rib 102, the flexing member 108 may be lowered by finger action into blade flexing relationship with member 98, the rib 102 being received within groove 114 in member 108. The springs 110 are compressed during this operation and immediately serve to separate the blade section members when member 108 is released. The blade 106 then may be reversed and the operation repeated to effect reverse flexing of the blade and thereby further improve the sharpness of the sharpened edges of the blade.

Figure 17:
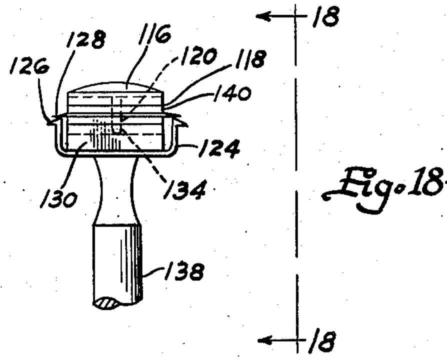
FIG. 17 is a fragmentary end elevation of an embodiment of apparatus comprising a safety razor to which the principles of the invention have been adapted.
Figure 18:
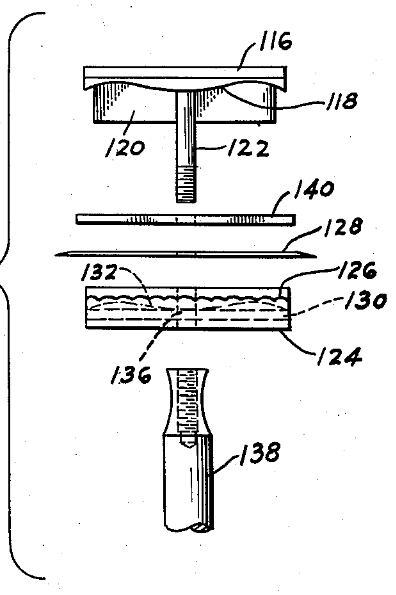
FIG. 18 is an exploded front view of the embodiment of apparatus shown in FIG. 17.

The invention also may be incorporated in a safety razor, whereby if desired, the blade may be flexed even during a shaving operation if for example the blade appears to become dull. An exemplary embodiment of the invention applied to a razor is illustrated in FIGS. 17 and 18, wherein the cap 116 of the razor is provided with a crenelated lower surface 118, a positioning rib 120 also projecting from said lower surface. A conventional threaded bolt 122 also projects from cap 116.

The razor also is provided with a suitable guard 124 which, in the exemplary illustration shown in FIGS. 17 and 18, is U-shaped in end view. Opposite guard rails 126 are provided so as to extend outward from the opposite blade edges 128 when the razor is positioned for shaving. Positioned within the guard 124 is a preferably fixed blade flexing member 130 having a crenelated upper surface 132 which is complementary to the crenelated surface 118 of cap 116. Further, the blade flexing member 130 is provided with a slot 134 which receives the positioning rib 120 of the cap, the member 130 and guard 124 also having a suitable opening 136 therethrough which receives the threaded bolt 122, the lower end of the latter being threadably engaged by handle 138 which is threaded to effect clamping action between the cap 116 and guard 124.

When the blade 128 is disposed between the cap and guard and particularly between the crenelated surfaces 118 and 132 thereof, and the handle 138 is screwed onto the bolt 122 sufficiently, the blade will be flexed by said crenelated surfaces in a manner similar to the flexing performed by the previously described embodiments of the invention. If desired, the handle 138 then may be disconnected to permit separation of the cap and reversing of the blade 128, following which the reassembly of the razor is made and the reverse flexing of the blade 128 then may be achieved.

While shaving, it is preferred that the blade 128 be backed on its surface adjacent the cap by a backing member 140 which preferably is thin but relatively rigid, whereby said backing member, which also is slotted to receive the rib 120, may be disposed between blade 128 and the crenelated surface 118 of cap 116, whereupon the handle 138 may be threaded onto bolt 122 as far as is permitted. This will dispose the backing member 140 against the crest of the crenelated surface 118 of cap 116 and also the backing member 140 thereby will be disposed flatly against the upper surface of blade 128 and offers rigid flat support to said blade while shaving.

From the foregoing, it will be seen that applicant's process of improving the sharpness of pre-sharpened flexible blades may be improved by reversely flexing the same along lines transverse to the cutting edges of said blades. A number of different embodiments of mechanisms for effectively and quickly performing such flexing, both on commercial and domestic scales are illustrated and described, as well as being claimed hereinafter. Such flexing of sharpened blades greatly improves the sharpened effect thereof by straightening the metallic, microscopic fibers projecting from the tips of the blade edges so as to dispose them substantially in a straight direction within the plane of the blade. Should these fibers become bent during cutting operations, the improved sharpness of the blade may be restored simply by again flexing the blade in the manner described. By such operation, the useful life of many types of blades is increased substantially, as well as the cutting quality being greatly improved.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. Mechanism to improve the sharpness of a sharpened flexible blade by flexing the same along axes transverse to the sharpened edge thereof and comprising a plurality of plate-like cooperating flexing members having reversely curved surfaces complementary to each other and having smoothly and oppositely curved crests and valleys in succession and arranged in staggered relationship relative to each other, whereby the crests and valleys on one member are cooperable respectively with the complementary smoothly curved valleys and crests on the other flexing member, said flexing members respectively being engageable with opposite surfaces of said blade and operable to flex the sharpened edge thereof as aforesaid, the axes of the crests and valleys of said curved surfaces being substantially parallel to each other and arranged to receive therebetween a substantially flat blade sharpened on at least one edge and said edge extending transversely to the axes of said curved surfaces, the valleys and crests of said curved surfaces of said flexing members having substantial radii and being sufficiently curved to flex said blade simultaneously in reverse directions substantial distances relative to the length of the blade along axes transverse to said blade edge when one of said members is moved toward the other in a direction substantially perpendicular thereto, thereby to straighten the metallic fibers projecting from said edge so as to project substantially straight therefrom within the plane of said blade, and means operable to guide said flexing members for relative movement toward and from each other.

2. The mechanism according to claim 1 further including mechanism supporting said flexing members respectively for movement relative to each other in opposite directions substantially perpendicular to the plane of a blade when disposed between said flexing members substantially in parallel relationship to the planes thereof.

3. The mechanism according to claim 2 further characterized by the supporting means for said flexing members comprising manually operable handles respectively connected at one end to said members, said handles being operatively connected for relative movement to move said members toward and from each other to flex a blade as aforesaid.

4. The mechanism according to claim 3 further characterized by one of said flexing members being pivotally connected to one of said handles and the other being fixedly connected to the other handle.

5. The mechanism according to claim 3 further characterized by one of said flexing members having a rib thereon projecting from the reversely curved surface thereof and extending transversely to the axes of the curves of said surface to position a slotted blade placed thereupon, and the other flexing member having a complementary slot therein to receive said rib when said flexing members are moved toward each other to flex said blade.

6. The mechanism according to claim 2 further characterized by said supporting means comprising a bracket member provided with a normally horizontal portion to which one of said flexing members is substantially fixedly connected, said bracket also having a plate integral with and extending vertically from said horizontal portion and arranged to be mounted upon a fixed vertical surface, and interengaging relatively movable guide means on said bracket member and other flexing member operable to effect guided movement of said other flexing member in opposite vertical directions relative to said fixedly supported flexing member, whereby a blade can be flexed reversely between the crenelated surfaces of said members when they are moved toward each other.

7. The mechanism according to claim 6 further characterized by said guide means comprising parallel elongated guide members fixed to said horizontal portion adjacent opposite ends thereof and projecting substantially vertical therefrom and the other member having guide openings therein slidably receiving said guide members.

8. The mechanism according to claim 7 further including compression spring means on said guide members and extending between said flexing members, said springs being operable to move said flexing members to separated position following movement thereof into blade-flexing relationship.

9. The mechanism according to claim 2 further characterized by said flexing members respectively comprising a cap of a safety razor and a guard of said razor, said razor also comprising a handle operable to move said cap into blade clamping relationship with said guard, whereby said cap and guard may be moved into blade-flexing relationship and also moved apart sufficiently to permit the blade to straighten for purposes of shaving.

10. The mechanism according to claim 9 further including a relatively stiff blade stabilizing member positionable between the curved surface of said cap and a blade, thereby to afford backing support for said blade while used as a razor.

References Cited in the file of this patent

UNITED STATES PATENTS

| | | |
|---|---|---|
| 1,124,461 | Kohlhepp | Jan. 12, 1915 |
| 1,478,835 | Peacock et al. | Dec. 25, 1923 |
| 1,564,696 | Locke | Dec. 8, 1925 |
| 1,593,168 | Gabauer | July 20, 1926 |
| 1,776,642 | Stanford | Sept. 23, 1930 |
| 1,806,437 | Woodward | May 19, 1931 |
| 1,923,738 | McBain | Aug. 22, 1933 |
| 1,968,424 | Rous | July 31, 1934 |
| 2,153,811 | Montgomery | Apr. 11, 1939 |
| 2,729,989 | McCue | Jan. 10, 1956 |
| 2,822,854 | Berg | Feb. 11, 1958 |